United States Patent [19]

Cornelius

[11] Patent Number: 4,529,937
[45] Date of Patent: Jul. 16, 1985

[54] METAL DETECTOR WITH SPRING LOADED HINGED SUPPORT

[76] Inventor: Billie G. Cornelius, 15515 Lee Rd., Houston, Tex. 77032

[21] Appl. No.: 453,219

[22] Filed: Dec. 27, 1982

[51] Int. Cl.³ .................. G01V 3/08; G01V 3/05
[52] U.S. Cl. ..................... 324/326; 15/143 R; 74/25; 16/281; 16/286; 403/100
[58] Field of Search .................. 324/326–329; 16/286, 281, 284, 322, 332, 242, 223; 15/143 R, 144 R; 74/25; 403/93–100

[56] References Cited

U.S. PATENT DOCUMENTS

| | | | |
|---|---|---|---|
| 1,688,930 | 10/1928 | Hyland | 16/286 X |
| 1,982,910 | 12/1934 | Forbes et al. | 15/143 R X |
| 2,191,348 | 2/1940 | Lauterbach | 15/143 R X |
| 2,329,895 | 9/1943 | Hausen | 74/25 X |
| 2,361,395 | 10/1944 | Gilligan | 15/143 R |
| 2,363,633 | 11/1944 | Welden | 74/25 |
| 2,375,118 | 5/1945 | Lesti | 16/332 X |
| 2,999,268 | 9/1961 | Strandengen | 16/332 |
| 3,512,420 | 5/1970 | Farmer | 74/25 |
| 3,908,481 | 9/1975 | Eisemann | 74/25 X |
| 4,021,725 | 5/1977 | Kirkland | 324/326 |
| 4,027,354 | 6/1977 | Burpee | 74/25 X |
| 4,258,323 | 3/1981 | Andrews et al. | 324/326 X |

FOREIGN PATENT DOCUMENTS

| | | | |
|---|---|---|---|
| 2361672 | 4/1978 | France | 324/329 |
| 376389 | 5/1964 | Switzerland | 16/322 |

Primary Examiner—Gerard R. Strecker
Assistant Examiner—Warren S. Edmonds
Attorney, Agent, or Firm—Neal J. Mosely

[57] ABSTRACT

A metal detector assembly consisting of a metal detector box component and a supporting shaft has a spring-loaded hinge-support interconnecting the box component and the head shaft component. The hinge-support comprises a frame attachment member and a pivotally connected shaft attachment member. A coiled spring surrounds the pivot connection and is biased between shoulders on each of the two members to permit a flexing action and cause a desirable smooth horizontal arcuate swinging action of the head component of the metal detector. The device exaggerates a slight wrist movement initiated by the user and continues to swing as the user walks about thereby reducing arm fatigue and facilitating a more efficient and reliable sweeping action of the metal detector head. Alternatively, the device may further contain a spring-loaded detent mechanism in the pivot connection to optionally hold the shaft in a rigid relation to the hand held box component when desired. A further embodiment of the device includes a motor-driven pivot assembly which produces a smooth horizontal sweeping action of the detector head without physical effort by the user.

7 Claims, 6 Drawing Figures

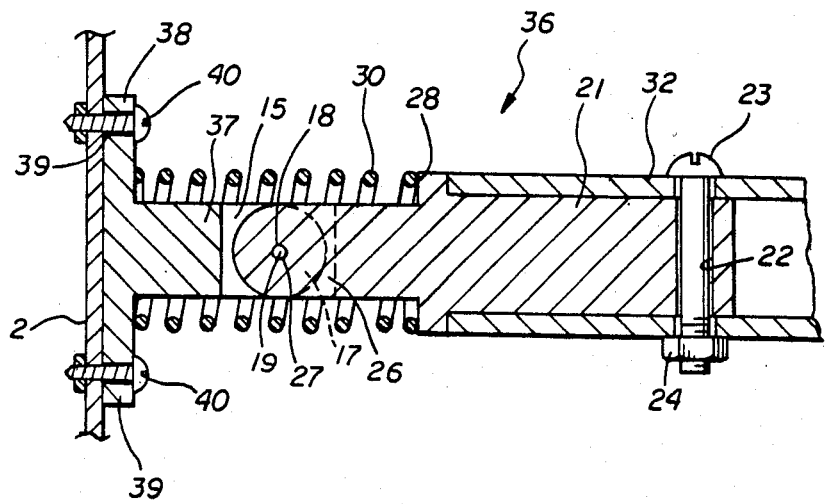
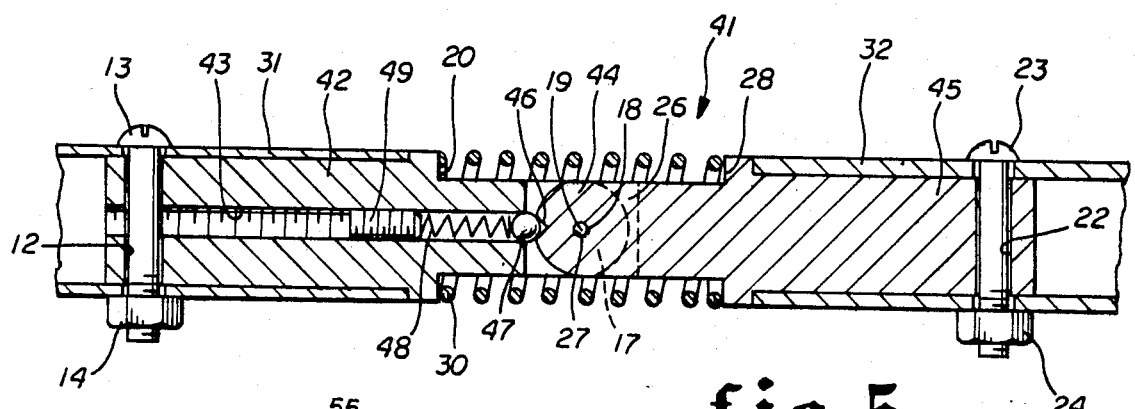
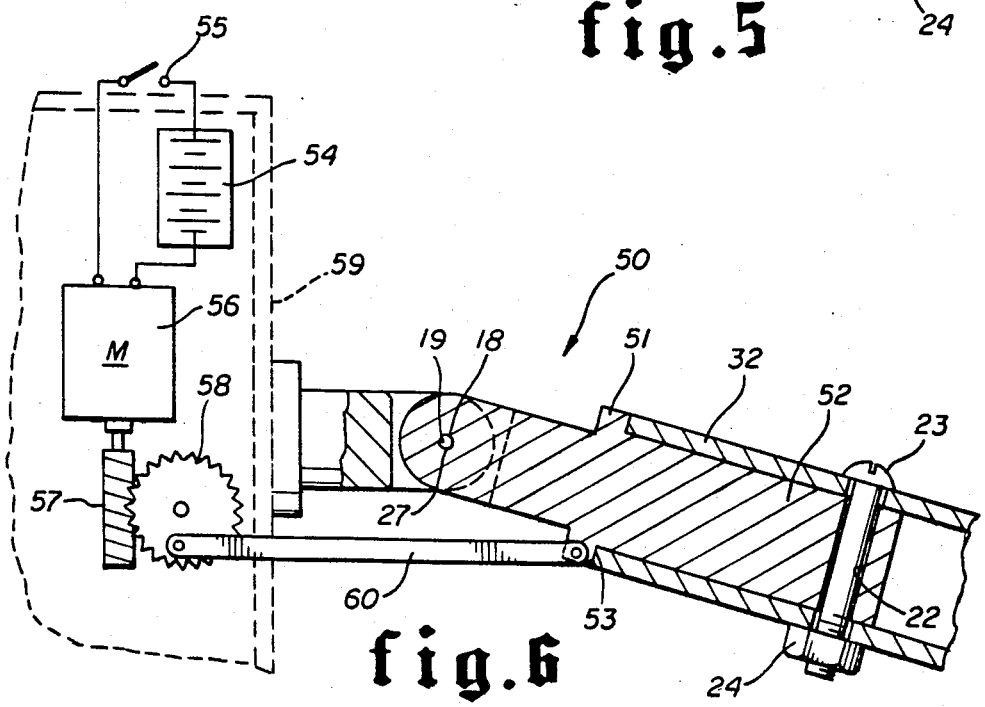

METAL DETECTOR WITH SPRING LOADED HINGED SUPPORT

BACKGROUND OF THE INVENTION

1. Field of the Invention

This invention relates to novel metal detector assemblies and more particularly to a metal detector with a spring-loaded hinge-support and to an improved method of searching for metal objects hidden in the ground.

2. Brief Description of the Prior Art

Use of hand held metal detectors to search for metal objects hidden in the ground is well known. Most metal detectors of this type consist of a generally rectangular box having a handle on the top and a rigid shaft connected to the bottom of the box frame and extending outwardly therefrom. A disc or ring shaped head member is attached to other end of the shaft. The user holds the metal detector by the handle and swings the head in horizontal arcuate path over the ground as he walks about. As the detector passes over a metal object the user is alerted by an audible or a visual signal.

Often the search will take many hours resulting in fatigue of the arm of the user. Sometimes if the arcuate sweeping action of the detector head is too fast or irregular a false signal is given to the user. As a result, there is a considerable need for a means to interconnect the hand held box member and the head shaft member of metal detectors which will allow a smooth regular sweeping action with a minimum of effort on the part of the user.

Forbes, U.S. Pat. No. 1,982,910 discloses a mop or other utensil connected to the lower member of a two member handle handle having a pivot between the upper and lower members. The pivoting device uses a coiled helical spring which tends to draw the two members back into alignment from the pivoted position. A leaf spring is mounted within the helical spring so that the flexing action acts in one plane only. The construction permits a bend in the handle upon application of bending force so that a mop or brush may be used underneath low articles of furniture. The particular construction is not be suitable for use with metal detectors because it would not be operable by a slight wrist action of the user as is the present invention which may be easily installed on existing detectors by a slight modification of the shaft member.

Lauterbach, U.S. Pat. No. 2,191,348 discloses a two member pivoted handle for a dust mop, broom, or the like. The device uses a tension spring and alternatively a leaf spring to draw the two members into line and contains a means to normally restrain the two members from pivotal movement except on the application of an appreciable bending force on the handle. The Lauterbach device pivots in one direction only and thus is incapable of performing a smooth horizontal swinging action as required for use with metal detectors and found in the present invention.

The prior art in general, and none of these patents in particular, disclose a spring-loaded hinge-support for interconnecting the hand held box component and the head shaft component of metal detectors comprising a frame attachment member and a pivotally connected shaft attachment member.

SUMMARY OF THE INVENTION

It is therefore one object of this invention to provide a metal detector assembly having a simple, inexpensive, spring-loaded hinge-support which permits a more efficient and reliable, smooth horizontal arcuate swinging action of the detector head.

Another object of this invention is to provide a metal detector assembly having a spring-loaded hinge-support which requires a minimum of effort on the part of the user and thereby reducing arm fatigue.

Another object of this invention is to provide a metal detector assembly having a spring-loaded hinge-support which will permit the detector head to be extended rigidly or pivotally as desired by the user.

A further object of this invention is to provide a metal detector assembly having a spring-loaded hinge-support which will enable the user to extend the detector head into hard to reach areas that would not be accessible with conventional metal detectors.

A still further object of this invention is to provide an improved method of searching for metal objects hidden in the ground.

A still further object of this invention is to provide an improved method of searching for metal objects hidden in the ground utilizing a metal detector which is moved in an arcuate sweeping action.

These and other objects of the invention will become apparent from time to time throughout the specification and claims as hereinafter related.

The above noted objects and other objects of the invention are accomplished by a metal detector assembly consisting of a metal detector box component and a supporting shaft which has a spring-loaded hinge-support interconnecting the box component and the head shaft component. The hinge-support comprises a frame attachment member and a pivotally connected shaft attachment member. A coiled spring surrounds the pivot connection and is biased between shoulders on each of the two members to permit a flexing action and cause a desirable smooth horizontal arcuate swinging action of the head component of the metal detector. The device exaggerates a slight wrist movement initiated by the user and continues to swing as the user walks about thereby reducing arm fatigue and facilitating a more efficient and reliable sweeping action of the metal detector head. Alternatively, the device may further contain a spring-loaded detent mechanism in the pivot connection to optionally hold the shaft in a rigid relation to the hand held box component when desired. A further embodiment of the device includes a motor-driven pivot assembly which produces a smooth horizontal sweeping action of the detector head without physical effort by the user.

BRIEF DESCRIPTION OF THE DRAWINGS

FIG. 4 is a horizontal cross section of an alternate embodiment of the spring-loaded hinge-support having a flanged member attached to the frame of a metal detector.

FIG. 5 is an alternate embodiment of the spring-loaded hinge-support having a spring-loaded detent mechanism in the pivot connection.

FIG. 6 is still another embodiment of the hinge-support having a motor-driven pivot assembly with the motor and drive components shown schematically.

DESCRIPTION OF THE PREFERRED EMBODIMENTS

Figure 1:
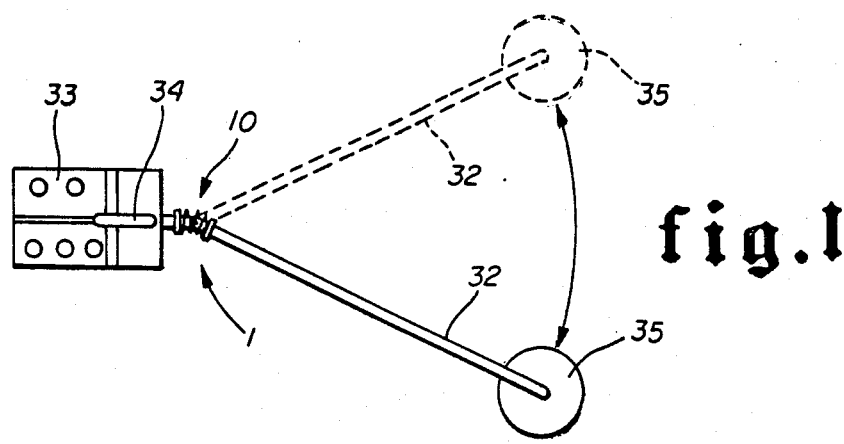
FIG. 1 is a top plan view of a metal detector assembly illustrating a preferred embodiment of the invention, showing in solid line one position of the detector head and in dotted line another position of the detector head along an arcuate path.
Figure 2:
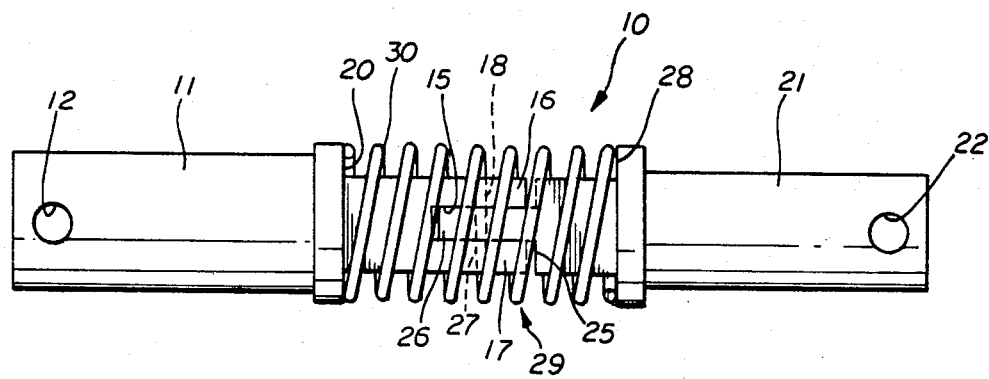
FIG. 2 is an enlarged side elevational view of the spring-loaded hinge-support used in the metal detector assembly of FIG. 1.
Figure 3:
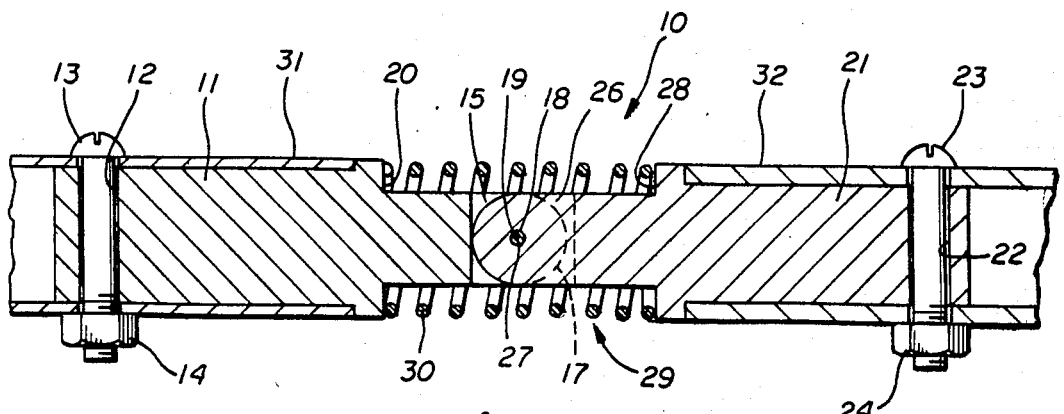
FIG. 3 is a longitudinal cross section of the spring-loaded hinge-support taken along section line 3—3 of FIG. 2.

Referring to the drawings by numerals of reference, and more particularly to FIGS. 1, 2, and 3, there is shown a metal detector assembly 1 having a spring-loaded hinge-support 10. Hinge-support 10 (FIGS. 2 and 3) comprises a cylindrical frame attachment member 11 having a transverse opening 12. Opening 12 is provided to receive a bolt 13 and nut 14 for attaching the member 11 to the tubular extension 31 of a conventional metal detector box frame 33. A slot 15 bifurcates the other end of frame attachment member 11 forming a yoke consisting of two rounded ears 16 and 17. Ears 16 and 17 contain a hole 18 normal to the slot 15 to receive a pivot pin 19. Frame attachment member 11 has a portion of enlarged diameter a short distance away from the slot 15 defining a shoulder 20.

A cylindrical shaft attacment member 21 forms the other half of hinge-support 10. One end of shaft attachment member 21 contains a transverse opening 22 to receive a bolt 23 and nut 24 for attaching the member 21 to a conventional metal detector head supporting shaft 32. Shaft attachment member 21 has a cut out portion 25 at the other end defining a round lug or tongue 26. Lug or tongue 26 has a hole 27 which aligns with holes 18, on assembly, to receive pivot pin 19. Frame attachment member 21 has a portion of enlarged diameter a short distance away from the lug of tongue 26 defining a shoulder 28. The ears 16 and 17, slot 15, lug 26, and pin 19 are sized to provide a free swinging hinge assembly 29. A helical spring 30 surrounds the hinge assembly 29 and is compressed between opposing shoulders 20 and 28 to urge the hinge assembly 29 into a normally straight position.

In most applications, the metal detector box 33 (which is of conventional design) has a tubular extension 31 into which the conventional tubular detector head shaft 32 is bolted. To install the spring-loaded hinge-support 10 on a conventional metal detector assembly, the shaft 32 is unbolted from tubular fitting 31. The frame attachment member 11 is inserted into tubular fitting 31 until the bolt holes are aligned with opening 12, then bolt 13 and nut 14 are installed. Shaft attachment 21 is inserted into tubular shaft 32 until the bolt holes are aligned with openings 22, then bolt 23 and nut 24 are installed.

FIG. 1 illustrates the swinging motion of the spring-loaded hinge-support 10. In operation, the user merely holds metal detector box 33 by the handle 34. The user's arm extends comfortably down by his side. The weight of the box 33 may even be supported by the user placing his thumb into his pants pocket or belt loop. The shaft 32 extends forward to the user and downward toward the ground so that the detection head 35 swings over the surface of the ground in close proximity thereto. The user initiates the swinging action by a slight sideways snap of the wrist. The weight of the detector head 35 and length of the downwardly and forwardly extending shaft 32 creates a moment arm of sufficient force to overcome the force of the compression spring 30, thus allowing the detector head 35 to swing in a smooth horizontal arcuate path over the ground.

As the detector head 35 swings horizontally, the spring 30 is compressed between shoulders 20 and 28 storing energy until there is sufficient stored spring force to overcome the moment arm of the detector head 35 and shaft 32, and the detector head is forced toward the normally straight position. When this position is reached, the spring 30 has less energy than the moment arm of the detector head 35 and the shaft 32, and they will swing to the other extension of the arcuate path and be urged back again.

The swinging action is that of a more or less horizontally extending pendulum with the spring 30 providing the energy to keep the swinging action going. The swinging action will gradually diminish and have to be reinforced from time to time. However, if the user is walking, the resulting motion will tend to keep the swinging action going indefinitely. Thus it can be understood that the spring-loaded hinge-support 10 greatly reduces arm fatigue encountered in the use of conventional metal detectors in searching for metal objects hidden in the ground.

ANOTHER EMBODIMENT OF THE INVENTION

In FIG. 4 there is shown an alternate embodiment of a spring-loaded hinge-support 36. This device has a modified frame attachment member 37 with a circular flange portion 38 located on the end opposite the slot 15. Flange 38 has a plurality of holes 39 for receiving bolts 40 for attaching the member 37 to the frame 2 of a conventional metal detector box. All other elements of this embodiment, i.e. the spring-loaded hinge-support 36, are the same as those previously described for the embodiment illustrated in FIGS. 1–3 and are numbered the same for purposes of clarity. Installation of the alternate embodiment 36 is accomplished by drilling holes in the box frame 2 to align with the holes 39 in the flange 38, and simply bolting or screwing the flange 38 to the box frame. This embodiment is designed for original installation by the manufacturer while the embodiment of FIGS. 1–3 is designed for addition to conventional equipment by the user.

A FURTHER EMBODIMENT OF THE INVENTION

Still another embodiment of a spring-loaded hinge assembly 41 is shown in FIG. 5. In this embodiment the frame attachment member 42 includes a longitudinal central bore 43 which is threaded at one end. The lug or tongue 44 on shaft attachment member 45 has a notch 46 in the end surface thereof. A ball 47 is inserted into the bore 43 and is biased into the notch 46 by a small compression spring 48. Spring pressure is applied by an allen head set screw 49 screwed into threaded end portion of bore 43 to contact spring 48. Use of the hinge assembly 41 permits a spring-loaded hinge-support to operate in either the normally straight position or in the swinging position. The set screw 49 may be adjusted to bias the ball 47 into the notch 46 so that a greater force is required to unseat the ball 47 and permit the swinging action, and the shaft and detector head will tend to resume the normally straight position rather than continue swinging. All other elements being the same as previously described are numbered the same for purposes of clarity.

ANOTHER EMBODIMENT OF THE INVENTION

FIG. 6 shows a motor-driven embodiment of a hinge assembly 50 in a metal detector. In this embodiment, the shoulder 51 on the shaft attachment member 52 contains a projecting lug 53. The drive mechanism (shown schematically) comprises a 12 volt d.c. battery 54, on-off switch 55, 12 volt d.c. motor 56, worm gear 57, and drive gear 58 supported in a metal detector box 59. A connecting rod 60 is pivotally attached eccentrically to drive gear 58 at one end and the other end is pivotally attached to the lug 53. To operate the motor-driven hinge assenbly 50, the user closes switch 55 causing current to flow from battery 54 to energize the motor 56 and turn worm gear 57. As worm gear 57 turns drive gear 58, the eccentrically attached connecting rod 60 will move reciprocally to effect movement of the shaft attachment member 52 in a smooth arcuate swinging action. This embodiment of the invention does not require a helical compression spring as in the other embodiments.

While this invention has been described fully and completely with special emphasis upon several preferred embodiments, it should be understood that within the scope of the appended claims the invention may be practiced otherwise than as specifically described herein.

I claim:

1. A portable metal detector assembly comprising
   a metal detector box and detector apparatus contained therein adapted to be held and carried by hand,
   a metal detector head, and
   a supporting shaft operatively supported on said detector box at one end and supporting said detector head for movement thereby in a sweeping movement,
   said assembly further including a spring-loaded hinge-support interconnecting said metal detector box and said head supporting shaft comprising;
   a frame attachment member operatively secured to said metal detector box,
   a shaft attachment member pivotally connected thereto at one end for angular pendulum movement in opposite directions relative to said detector box and connected at the other end to said supporting shaft for said detector head, and
   spring means interconnecting said frame attachment member and said shaft attachment member to apply a bias to assist in maintaining a pendulum swinging movement of said supporting shaft once initiated.

2. A portable metal detector assembly according to claim 1 in which
   said frame attachment member has a shoulder thereon adjacent said pivotal connection,
   said shaft attachment member has a shoulder thereon adjacent to said pivotal connection, and
   said said shaft attachment member biasing means comprises a coiled spring surrounding the said pivot connection and biased between said shoulders facilitating a flexing action therebetween 3. A portable metal detector assembly according to claim 1 in which
   said frame attachment member comprises a cylindrical member having a transverse opening at one end for receiving a bolt to attach the same to said metal detector box,
   the other end of said frame attachment member having a slot bifurcating the same to define a yoke consisting of two rounded ears,
   said ears having a hole normal to said slot,
   a concentric larger diameter portion on said frame attachment member closely adjacent said slot defining a shoulder thereon,
   said shaft attachment member comprises a cyindrical member receiving said shaft supporting member and having a transverse opening at one end receiving a bolt securing the same to said shaft supporting member,
   said shaft attachment member having a cut out portion defining a rounded lug on the other end thereof,
   said lug having a hole aligned with said holes in said ears,
   a pivot pin positioned in said aligned holes,
   a concentric larger diameter portion located on said shaft attachment member closely adjacent to said lug and defining a shoulder thereon,
   said ears, slot, lug, and pivot pin being sized to provide a free swinging hinge assembly, and
   a coiled helical compression spring surrounding said hinge assembly biased between said shoulders to facilitate a flexing action therebetween.

4. A portable metal detector assembly according to claim 3 in which
   said frame attachment member has a circular flange portion on the end opposite said slot, and
   said flange portion having a plurality of holes in which there is positioned fastening means securing the same to a metal detector box.

5. A portable metal detector assembly according to claim 3 in which
   said cylindrical frame attachment member further comprises,
   a spring-loaded adjustable detent mechanism operable to hold said shaft attachment member in a rigid relation to said frame attachment member, and
   said lug contains a notch interactive with said detent mechanism.

6. A method of search for metal objects hidden in the ground utilizing a hand held metal detector assembly comprising a metal detector box and detector apparatus contained therein adapted to be held and carried by hand,
   a metal detector head, and
   a supporting shaft operatively supported on said detector box at one end and supporting said detector head for movement thereby in a sweeping movement,
   said assembly further including a spring-loaded hinge-support interconnecting said metal detector box and said head supporting shaft comprising;
   a frame attachment member operatively secured to said metal detector box,
   a shaft attachment member pivotally connected thereto at one end for angular pendulum movement in opposite directions relative to said detector box and connected at the other end to said supporting shaft for said detector head, and
   spring means interconnecting said frame attachment member and said shaft attachment member to apply a bias to assist in maintaining a pendulum swinging movement of said supporting shaft once initiated;

said method comprising supporting said metal detector head adjacent to the surface of the ground, and initiating a swinging action in the interconnected components to cause said metal detector head to oscillate back and forth on said supporting shaft while maintaining said metal detector box in a substantially stationary position on the person of the user.

7. In a method of searching for metal objects according to claim 6 in which said swinging action in the interconnected components is initiated by a slight wrist movement, and maintaining a smooth even horizontal swinging action in the interconnected components by walking about whereby said metal detector head oscillates over the surface of the ground and is moved forward by the walking movement of the user.

* * * * *